United States Patent [19]

Eriksson

[11] 3,845,839
[45] Nov. 5, 1974

[54] NOISE DAMPING DEVICE FOR MOTOR BOATS

[76] Inventor: Henning Emanuel Eriksson, Furumostigen 10, 95200 Kalix, Sweden

[22] Filed: Mar. 7, 1973

[21] Appl. No.: 339,021

[30] Foreign Application Priority Data
Mar. 10, 1972 Sweden.............................. 3029/72

[52] U.S. Cl.................... 181/33 K, 123/198 E, 9/6, 115/42, 114/201, 290/1
[51] Int. Cl....... F01n 7/00, B63h 5/06, F02b 77/00
[58] Field of Search...181/33 K, 33 C, 33 G, 33 GB; 290/1 R, 1 B; 115/42, 39, 18, 34 R; 114/201, 203; 123/198 E, 195 C; 9/400, 6

[56] References Cited
UNITED STATES PATENTS

| 3,164,122 | 1/1965 | Fageol | 115/18 R |
| 3,170,435 | 2/1965 | Najimian | 115/34 R |
| 3,487,804 | 1/1970 | Kiekhaefer | 115/34 R |

FOREIGN PATENTS OR APPLICATIONS

| 567,567 | 2/1945 | England | 123/198 E |
| 561,876 | 10/1932 | Germany | 123/198 E |

Primary Examiner—George H. Miller, Jr.
Attorney, Agent, or Firm—V. Alexander Scher

[57] ABSTRACT

A device for use in a motor boat for damping the noise directly or indirectly produced by a motor, has a noise damping receptacle in the shape of a sliding box adjustably and elastically mounted in the body of the boat and preferably having a tapering longitudinal section.

11 Claims, 4 Drawing Figures

NOISE DAMPING DEVICE FOR MOTOR BOATS

This invention relates to a noise damping device for motor boats.

For damping the noise caused by a boat motor and also for reducing the vibrations, hitherto the motor has been surrounded by a receptacle shaped as a hood which can be opened directly or by means of hinges secured to the body of the boat. Further reduction of the noise has been attained by lining the inside of the receptacle with foamed rubber or the like.

It is also known to use a motor receiving receptacle made as an adjoining piece or a part of the body and suspended from the main part of the body by means of connection members.

However, a drawback of this arrangement, consisting of an adjoining piece of the body is the fact that special vibration damping attachment devices must be placed between the main body of the boat and the adjoining piece comprising the motor, the attachment devices being affected by the weight of the adjoining piece body and the motor, so that the vibration damping rubber parts included in the attachment devices will be strained by high pressure and tensile stress, thereby strongly reducing the vibration damping effect of these rubber parts.

An object of the present invention is to eliminate the drawbacks of existing constructions.

Other objects will become apparent in the course of the following specification.

In the accomplishment of the objectives of the present invention it was found desirable to provide a receptacle having the form of a sliding box insertable into a cavity of the boat body, preferably having a tapering cross-section thereby reducing the noise and vibrations to a great extent.

An advantage of the present invention besides noise and vibration reducing resides in the fact that motor exchange is made quickly and is uncomplicated, in that, if the motor is defective, the same can be exchanged for a faultless one thereby avoiding the unnecessary time of waiting.

The invention will appear more clearly from the following detailed description when taken in connection with the accompanying drawings showing by way of example only, preferred embodiments of the inventive idea.

Figure 1:
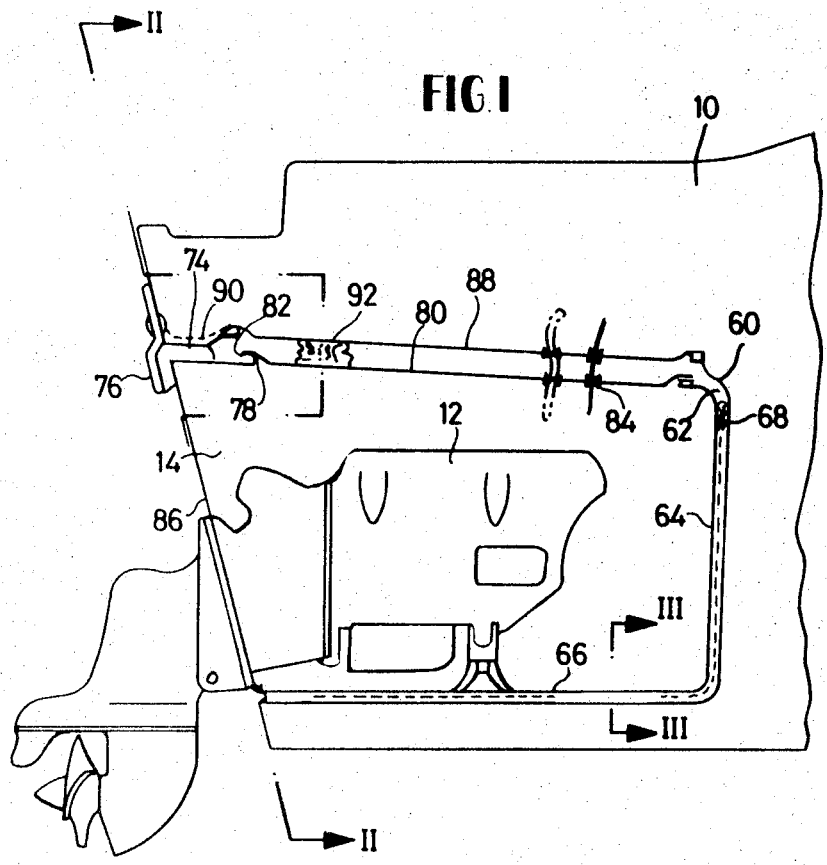
Fig. 1 is a longitudinal section through the stern part of a motor boat having a sliding box along the line I — I of FIG. 2.
Figure 3:
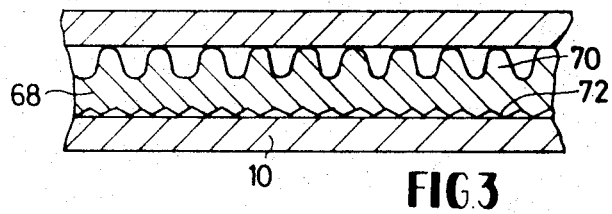
FIG. 3 is an enlarged detailed section along the line III — III of FIG. 1.
Figure 2:
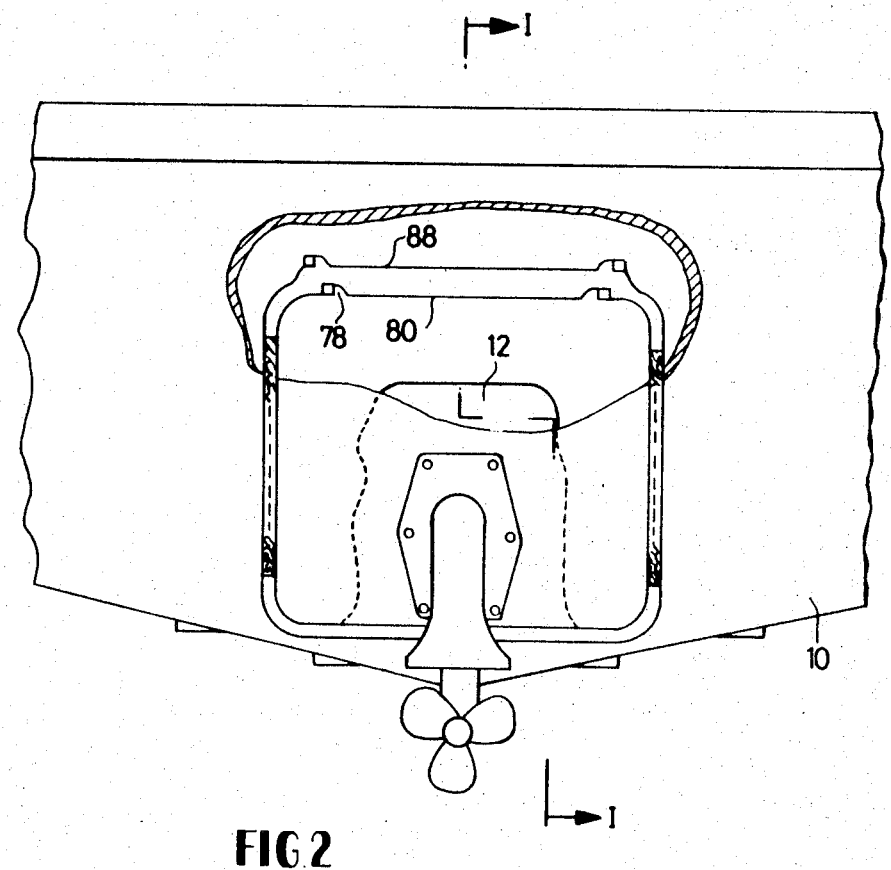
FIG. 2 is a section along the line II — II of FIG. 1.

The motor boat shown in FIGS. 1 and 2 is provided with a body 10, a motor 12 and a receptacle 14 wherein the motor 12 is installed. The receptacle is entirely closed and designed as a motor receiving sliding box, the form of which tapers in the direction from the stern towards the bow, so that the wedge-like sliding box can be easily inserted into the body 10 or taken out therefrom. For this purpose the body is provided with a cavity 60, the form of which essentially is that of a parallelepiped and the size thereof is so dimensioned that a gap 62 is provided between the adjoined receptacle 14 and the cavity 60. The gap at the front wall 64 and the lower face 66 serves for receiving a vibration damping member 68 having the form of a rubber mat provided with protrusions 70 and riffles 72 at the upper and lower sides respectively. This rubber mat can be made in different ways and the open spaces surrounding the protrusions and riffles of the mat can be dimensioned for achieving suitable pressure of the elastical material so that a perfect noise and vibration damping effect will be attained. The sliding box 14 has five of its faces encased by the cavity 60 while only one of the faces extends out of the stern of the boat.

Besides at the lower and front face of the sliding box, slices 74 of mat material also can be placed in the gap 62 at the side and upper faces of the sliding box.

To prevent the sliding box from being moved out of its position in the cavity 60 when the boat is going astern, a fitting 76 at the stern is provided which fitting extends somewhat beyond and along the back of the sliding box. Between the fitting 76 and the back of the sliding box there is placed a piece of mat material 74 in order to damp eventual longitudinal vibrations of the sliding box.

The upper face of the sliding box is provided with an opening 78 in order to get access to the interior of the box and the motor 12 from the inside of the boat. This opening 78 is closed by a hatch 80 which in a suitable manner is tightened and secured to the reinforced edge 82 of the opening 78 and provided with lead-in bushings 84 or quick action tube couplings for entrance of fuel tubes, regulating cables, electric leads and the like. Moreover, the back 86 of the sliding box is provided with pipe sockets (not shown) and intended for the exhaust of the motor and the ventilation of the interior of the sliding box. A hatch 88 corresponding to the hatch 80 is located in the part of the cavity which forms the upper wall 90 of the opening 60. The hatch 88 is somewhat larger than the hatch 80 of the sliding box to provide an easy access to the box opening 78. To avoid that the space between the two hatches 80 and 88 should constitute a noise transfer bridge there is arranged a noise damping material 92, such as foamed plastics.

Figure 4:
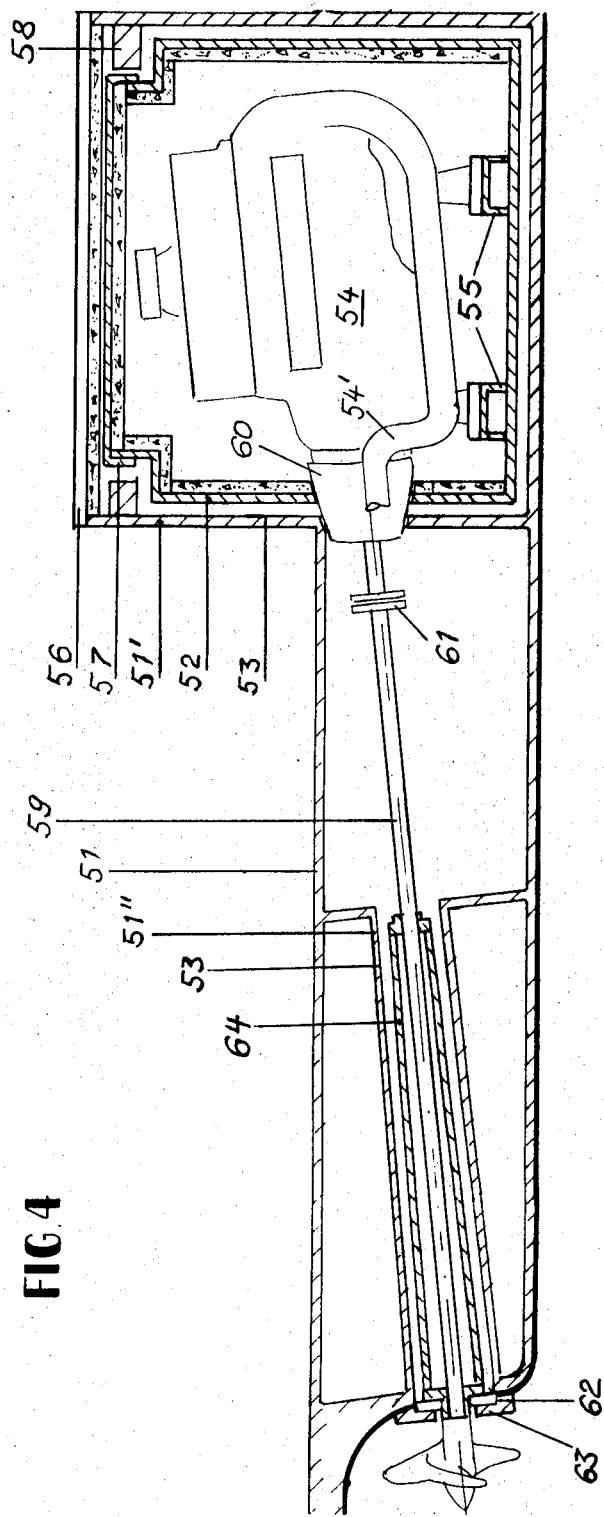
FIG. 4 is a longitudinal section illustrating a different construction.

The motor boat shown in FIG. 4 is provided with a body 51 having a double bottom, bulkhead-like transverse walls and longitudinal stiffening walls. Some walls form a cavity, namely a downwards closed shaft 51', and others form a conical barrel 51''. A sliding box 52 for receiving a motor 54 is placed within the shaft 51' and is retractable therefrom, the motor 54 resting on a foundation 55 at the bottom of the box. At its upper end the sliding box is provided with an opening formed by a flange and closed by a hatch 57 in order to get access to the motor 54. The inner walls of the box and the lower face of the hatch 57 are lined with noise absorbing material. The sliding box 52 rests on the bottom of the hull and abuts the side walls of the shaft through vibration damping material 53. The same material is placed between shoulders at the outer edge of the upper wall of the box and ledges 58 secured to the inner wall of the shaft by means of a quick action lock device (not shown), the ledges 58 taking up vertically acting vibration forces of the motor. Between the strips 53 of the vibration damping material shown in the drawings the inner walls of the shaft 51' can be lined with further noise damping material. On the top of the shaft there is arranged a shaft hatch 56 which at its lower face likewise is lined with noise absorbing material.

The clutch of the motor connecting it with the propelling screw-shaft 59 of the boat is arranged in such a way that that part of the clutch which is secured to the motor shaft does not extend out of the sliding box 52, so that this part of the clutch will flush with the outer surface of the sliding box. After the sliding box together with the motor has been placed within the shaft 51', the two parts of the clutch are put together, whereupon a cap 60 axially divided in several parts, is mounted on the clutch.

The cap can have any other suitable form, for example a cylindrical configuration, and the clutch can be of any suitable type. Besides the clutch, the motor 54 incorporates a reducing and reversing gear (not shown). To facilitate the mounting and dismounting of the clutch when the sliding box is placed into the shaft 51' and retracted therefrom, the propelling screw-shaft 59 is divided in two parts, and the intersection point is provided with a further clutch 61 so that only the small weight of the short shaft length between the cap 60 of the motor and the clutch 61 of the shaft must be handled when connecting the motor to the shaft 59 or disconnecting it.

Moreover, the clutch 61 facilitates the removal of the propelling screw-shaft 59 out of the boat without dismounting the cap 60 of the motor.

Besides the motor shaft coupled with the propelling screw-shaft 59, there are also coupled the exhaust pipe 54', cooling water conduits (not shown) and a ventillating appliance (not shown) for ventilating the inner of the sliding box 52, with corresponding conduits arranged in the body of the boat.

The main part of the propelling screw-shaft 59 which is provided with the propeller, is arranged in a further vibration and noise reducing sliding box 64 since the propeller, when swirling the water, generates considerable noise and vibration, especially if the propeller speed is high. The sliding box 64 similarly to the barrel 51" is made of conical shape for facilitating the mounting of the sliding box into the barrel, namely if the vibration damping material is secured to the inside of the barrel or if this material is fitted on the outside of the sliding box 64. However, it is most expedient to fasten the material to the outside of the sliding box 64 to make it possible to exchange the material from the sliding box after having drawn it out. The sliding box 64 is sealed with respect to the hull 51 by means of an elastical gasket 62 and a securing ring 63 in order to tighten up and to retain the gasket. The gasket can be secured to the sliding box 64 by glueing to enable minor axial movements of the sliding box without diminishing the sealing effect.

I claim:

1. In a motor boat having a body and a motor, a device for damping the noise produced by said motor, said device having a receptacle carrying said motor, said receptacle being a box retractably mounted in a cavity arranged in said body, a space being formed between the box and said body and a noise damping material at least partly filling said space.

2. A device in accordance with claim 1, wherein said noise damping material is a rubber mat which at its upper and lower surface is provided with protrusions and riffles respectively.

3. A device in accordance with claim 1, wherein said space is sealed at the outside of said body by means of an elastical gasket and a securing ring.

4. In a motor boat having a body and a motor, a device for damping the noise produced by said motor, said device having a receptacle carrying said motor, said receptacle being a box retractably mounted in a cavity arranged in said body, said box having a hatch at its upper face, a corresponding hatch being provided in the wall of said cavity opposite to the first-mentioned hatch.

5. A device in accordance with claim 4, wherein said hatches are provided with lead-in bushings or quick action tube couplings for entrance of fuel, regulating cables, electric leads and the like.

6. In a motor boat having a body and a motor, a device for damping the noise produced by said motor, said device having a receptacle carrying said motor, said receptacle being a box retractably mounted in a cavity arranged in said body, said cavity being a vertical shaft, and vibration-damping material located upon the bottom of said shaft, said box resting upon said vibration-damping material and being retractable from said shaft.

7. A device in accordance with claim 6, wherein said motor comprises a clutch consisting of two parts, one part thereof flushing with the outer surface of said box while the other part is secured to a propelling screw-shaft.

8. A device in accordance with claim 7, wherein said propelling screw-shaft is divided into two parts, the dividing point being arranged near to said clutch, a further clutch being adapted to interconnect said two parts.

9. A device in accordance with claim 8, wherein the box at its upper wall abuts against ledges arranged at the inner walls of said shaft, vibration damping material being placed between said upper wall and said ledges, the ledges being removable by means of quick action lock devices.

10. In a motor boat having a body and a motor, a device for damping the noise produced by said motor, said device having a receptacle carrying said motor, said receptacle being a box retractably mounted in a cavity arranged in said body, and a further box arranged for receiving a propelling screw-shaft, said further box being conical and retractably mounted in a further cavity, said further cavity likewise having a conical configuration.

11. In a motor boat having a body and a motor, a device for damping the noise produced by said motor, said device having a receptacle carrying said motor, said receptacle being a box retractably mounted in a cavity arranged in said body, said box being arranged to receive a propelling screw-shaft, said cavity being entirely closed, with the exception of an opening for passing said box and a further opening for passing said propelling screw-shaft.

* * * * *

UNITED STATES PATENT OFFICE
CERTIFICATE OF CORRECTION

Patent No. 3,845,839                  Dated November 5, 1974

Inventor(s) Henning Emanuel Eriksson

It is certified that error appears in the above-identified patent and that said Letters Patent are hereby corrected as shown below:

On the cover sheet under [30] insert -- Oct. 22, 1972 Sweden 13907-72 --.

Signed and sealed this 21st day of January 1975.

(SEAL)
Attest:

McCOY M. GIBSON JR.
Attesting Officer

C. MARSHALL DANN
Commissioner of Patents